US012312758B2

(12) United States Patent
Anand et al.

(10) Patent No.: US 12,312,758 B2
(45) Date of Patent: May 27, 2025

(54) FAN FOR REGENERATIVE AIR VACUUM STREET SWEEPER, AND METHOD OF FAN MANUFACTURE AND ASSEMBLY

(71) Applicant: CURBTENDER SWEEPERS LLC, Cedar Falls, IA (US)

(72) Inventors: Aditya G. Anand, Waterloo, IA (US); Clayton D. Wright, Des Moines, IA (US); Aaron T. Baughman, Cedar Falls, IA (US)

(73) Assignee: CURBTENDER SWEEPERS LLC, Cedar Falls, IA (US)

(*) Notice: Subject to any disclaimer, the term of this patent is extended or adjusted under 35 U.S.C. 154(b) by 0 days.

(21) Appl. No.: 18/516,007

(22) Filed: Nov. 21, 2023

(65) Prior Publication Data

US 2024/0093446 A1 Mar. 21, 2024

Related U.S. Application Data

(62) Division of application No. 18/179,832, filed on Mar. 7, 2023, now Pat. No. 11,866,895, which is a division of application No. 16/948,335, filed on Sep. 14, 2020, now Pat. No. 11,702,806.

(51) Int. Cl.

| | |
|---|---|
| ***F04D 29/28*** | (2006.01) |
| ***A47L 5/22*** | (2006.01) |
| ***A47L 9/10*** | (2006.01) |
| ***E01H 1/08*** | (2006.01) |
| ***F04D 17/16*** | (2006.01) |
| ***F04D 29/42*** | (2006.01) |

(52) U.S. Cl.

CPC .............. *E01H 1/0836* (2013.01); *A47L 5/22* (2013.01); *A47L 9/104* (2013.01); *F04D 17/164* (2013.01); *F04D 29/281* (2013.01); *F04D 29/282* (2013.01); *F04D 29/4226* (2013.01); *E01H 1/0845* (2013.01); *F05D 2230/10* (2013.01)

(58) Field of Classification Search

CPC ........... E01H 1/083; A47L 5/22; F04D 29/281

See application file for complete search history.

(56) References Cited

U.S. PATENT DOCUMENTS

| | | | |
|---|---|---|---|
| 3,790,981 | A | 2/1974 | Young |
| 4,660,248 | A | 4/1987 | Young |
| 4,691,402 | A | 9/1987 | Veselka |
| 4,773,121 | A | 9/1988 | Young |
| 5,072,485 | A | 12/1991 | Young et al. |
| 5,113,548 | A | 5/1992 | Young et al. |
| 6,122,797 | A | 9/2000 | Vanderlinden |
| 6,161,250 | A | 12/2000 | Young et al. |
| D472,347 | S | 3/2003 | Stout et al. |

(Continued)

*Primary Examiner* — Sabbir Hasan

(74) *Attorney, Agent, or Firm* — McKee, Voorhees & Sease, PLC

(57) ABSTRACT

A fan with airfoil blades is provided for a regenerative air vacuum street sweeper. The blades are formed using cut and pressed upper and lower panels which are welded at a forward edge to a rod to form the airfoil leading edge and welded at the rear edges to form the airfoil trailing edge. Pins extend laterally outwardly from the rod for mounting each blade in corresponding holes in the front and rear plates of the fan housing. The side edges of the blade are welded to the plates at a 9-11° angle of attack. The airfoil blades allow for reduced size, horse power, noise, and manufacturing and shipping costs.

20 Claims, 5 Drawing Sheets

(56) References Cited

U.S. PATENT DOCUMENTS

| | | | |
|---|---|---|---|
| 7,185,953 B1 | 3/2007 | Young | |
| 8,060,978 B2 | 11/2011 | Young et al. | |
| 9,951,782 B2 | 4/2018 | Kurihara et al. | |
| 9,995,311 B2 * | 6/2018 | Son | B21D 11/20 |
| 10,711,416 B2 * | 7/2020 | Glubrecht | A46B 13/008 |
| 2020/0025209 A1 | 1/2020 | Stanley et al. | |
| 2020/0116157 A1 * | 4/2020 | Tanaka | F04D 29/626 |

* cited by examiner

FAN FOR REGENERATIVE AIR VACUUM STREET SWEEPER, AND METHOD OF FAN MANUFACTURE AND ASSEMBLY

CROSS REFERENCE TO RELATED APPLICATIONS

This is a divisional application of U.S. Ser. No. 18/179,832, filed Mar. 7, 2023, which is a divisional application of U.S. Ser. No. 16/948,335, filed Sep. 14, 2020, now U.S. Pat. No. 11,702,806, issued Jul. 18, 2023, entitled FAN FOR REGENERATIVE AIR VACUUM STREET SWEEPER, AND METHOD OF FAN MANUFACTURE AND ASSEMBLY. The entire contents of these patent applications are incorporated herein by reference including, without limitation, the specification, claims, and abstract, as well as any figures, tables, or drawings thereof.

FIELD OF THE INVENTION

The present invention is directed toward an approved fan system for a regenerative air vacuum street sweeper, and particularly to a fan system having airfoil blades, a rod forming the leading edge of each blade, and lateral side pins for mounting the blades into the fan housing.

BACKGROUND OF THE INVENTION

In the street sweeping industry, there are two types of air vacuum machines for removing debris from the street or road surface: a pure air vacuum machine and a regenerative air vacuum machine. The regenerative air machine is a closed loop system wherein the fan creates a high velocity, controlled jet of air. The regenerative air system utilizes a pickup head with a tube on each lateral side of the pickup head. Gutter brooms may be provided in front of the pickup head and rotate to dislodge debris from the street or road surface. A fan blows air down one tube to the pickup head, so as to dislodge and suspend debris, which is vacuumed upwardly through the other tube on the pickup head and directed to a hopper on the rear of the street sweeper truck. The debris-laden air stream is pulled into the large hopper, wherein the air velocity drops, such that the larger or heavier debris falls into the bottom of the hopper. A screen at the top of the hopper prevents lighter weight items, such as leaves, paper, and the like, from exiting the hopper and entering the centrifuge dust separator. A dust separator spins the dust-carrying air along the curved wall of the chamber until the micron-sized dust particles drop back into the hopper. Clean air from the separator is returned to the blower or fan to start the cycle again. This closed-loop system eliminates dirty air being exhausted into the atmosphere or into the environment.

The fan mechanism of the regenerative air sweeper is important to the machine's effectiveness. The conventional fan utilizes flat or straight blades and requires considerable power for operation to generate the desired air velocity on one side and a vacuum on the other side of the pickup head. The large prior art fan and motor is loud, and typically requires ear protection to meet OSHA requirements when the fan is operated at full speed. All these requirements for the conventions regenerative air street sweeper add size, weight, and costs for the sweeper, making the sweepers expensive pieces of equipment to own and operate.

Accordingly, a primary objective of the present invention is the provision of an improved fan assembly for a regenerative air vacuum street sweeper.

Another objective of the present invention is the provision of a vacuum street sweeper fan assembly having airfoil blades.

A further objective of the present invention is the provision of airfoil blades for a regenerative air vacuum street sweeper fan assembly, wherein the blades are economically manufactured using conventional manufacturing equipment in a simple, cost-effective manner.

A further objective of the present invention is the provision of a method of assembling blades in a fan housing for a regenerative air vacuum street sweeper.

Another objective of the present invention is the provision of a street sweeper fan assembly having increased airflow, decreased horsepower, decreased size, reduced operating noise levels, and lower costs, compared to conventional street sweeper fans.

These and other objectives will become apparent from the following description of the invention.

SUMMARY OF THE INVENTION

The fan assembly of the present invention is intended for use in a regenerative air vacuum street sweeper. The fan assembly includes a plurality of blades having an airfoil profile. The blades have a simplified method of manufacture and assembly. Each blade includes upper and lower curved rectangular panels having a forward edge and a trailing edge. A tube or rod is provided at the forward edges of the panels to form the leading edge of the airfoil. A pin extends outward from each end of the tube or rod for receipt in holes in the opposite side walls of the fan housing. The edges of the airfoil panels are then welded to the housing sidewalls, with an angle of attack of approximately 9-11°.

DETAILED DESCRIPTION OF THE PREFERRED EMBODIMENTS

Figure 1:
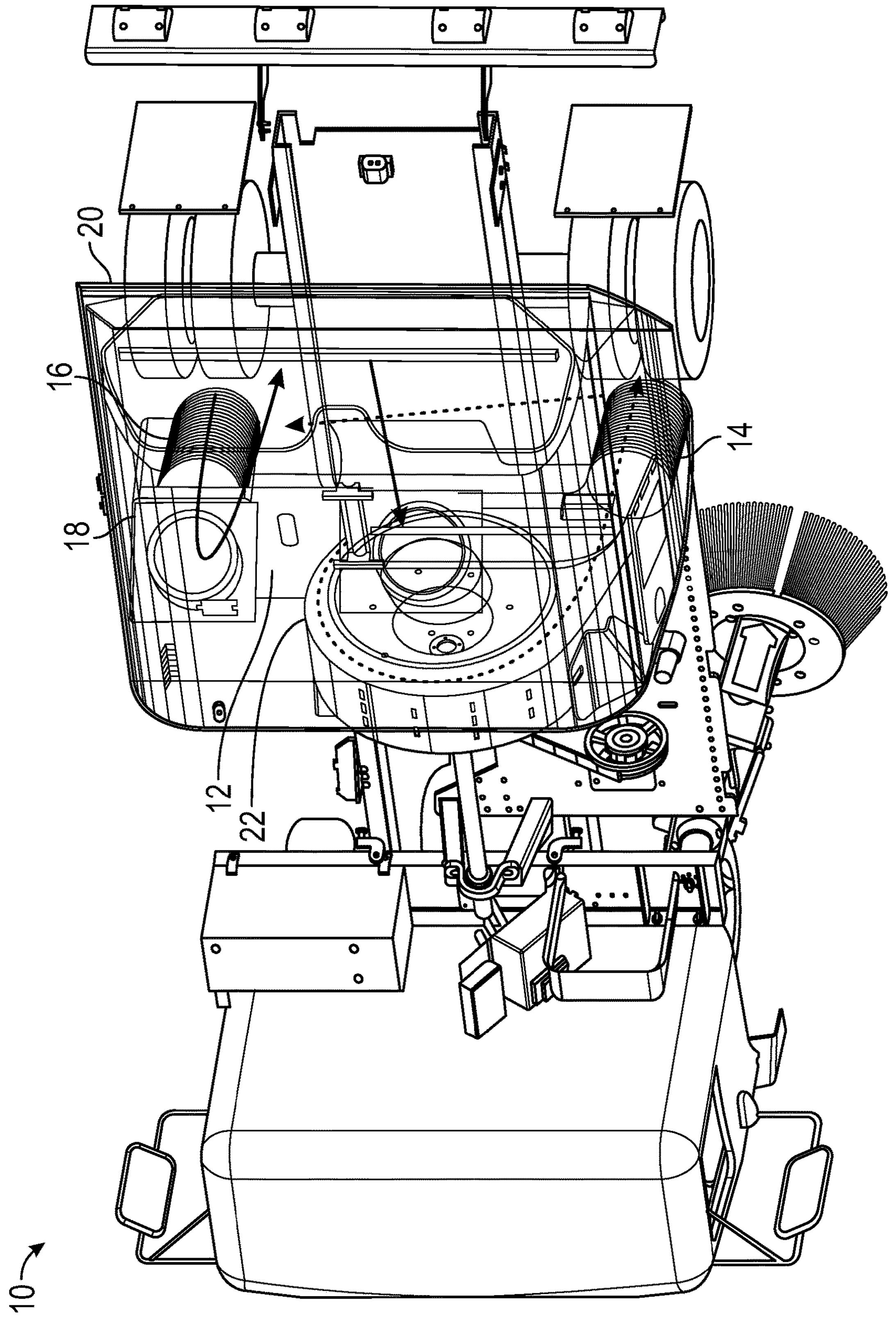
FIG. 1 is a perspective view illustrating a regenerative air vacuum street sweeper having the fan assembly of the present invention.

A regenerative air street sweeper 10 is shown in FIG. 1. The sweeper 10 is normally mounted on the chassis of a truck. The sweeper 10 includes a pickup head 12 adapted to be positioned closely above the street or road surface. A first tube 14 directs high velocity air to the pickup head 12, such that the air dislodges and suspends dust, particles, and other debris on the road surface for suspension and vacuuming into a second tube 16 which leads to an enlarged hopper 18 on the rear of the sweeper 10. The air velocity is substantially reduced in the hopper 18, such that the particles and dust fall into the bottom of the hopper. The dust-carrying air is then directed to a dust separator 20 having filters for removing the dust. The clean air is then recycled to the air outlet tube 14 to continue the vacuum process.

The above description of the sweeper 10 is conventional and does not constitute a part of the present convention.

The invention is directed toward the air circulation fan 22 which directs the air to the outlet tube 14 and draws the air into the inlet tube 16 of the pickup head 12. In a conventional sweeper, the fan blades are flat. In the present invention, the fan blades 24 have a profile of an airfoil, with a curved upper surface 26, a curved lower surface 28, a leading edge 30, and a trailing edge 32.

Airfoil blades used in other industries are normally cast, stamped, or extruded, each of which requires specialized equipment, and involves relatively costly manufacturing. For these reasons, airfoil blades have not been used in the vacuum street sweeping industry. The airfoil blades 24 of the street sweeper fan 22 are manufactured with different methodology, at a substantially reduced cost.

More particularly, in the present invention, and the preferred embodiment, the upper surface 26 and the lower surfaced 28 of each blade 24 are cut from sheet-metal, or similar material, using a cutting machine, and then bent into their respective curved profiles using a brake press. Thus, the rectangular panels which form the upper and lower surfaced 26, 28 are first cut and then bent using relatively simple equipment and at substantial cost savings compared to conventional manufacturing of airfoil blades.

The forward edges of the upper and lower panels are welded or otherwise fixed to an elongated, tubular rod 34, so as to form the leading edge 30 of the blade 24. The rear edges of the upper and lower panels 26, 28 are welded together to form the trailing edge 32. This process of forming the airfoil profile of the blades 24 is substantially less expensive than the methodology used for conventional airfoil blades in other industries.

Figure 2:
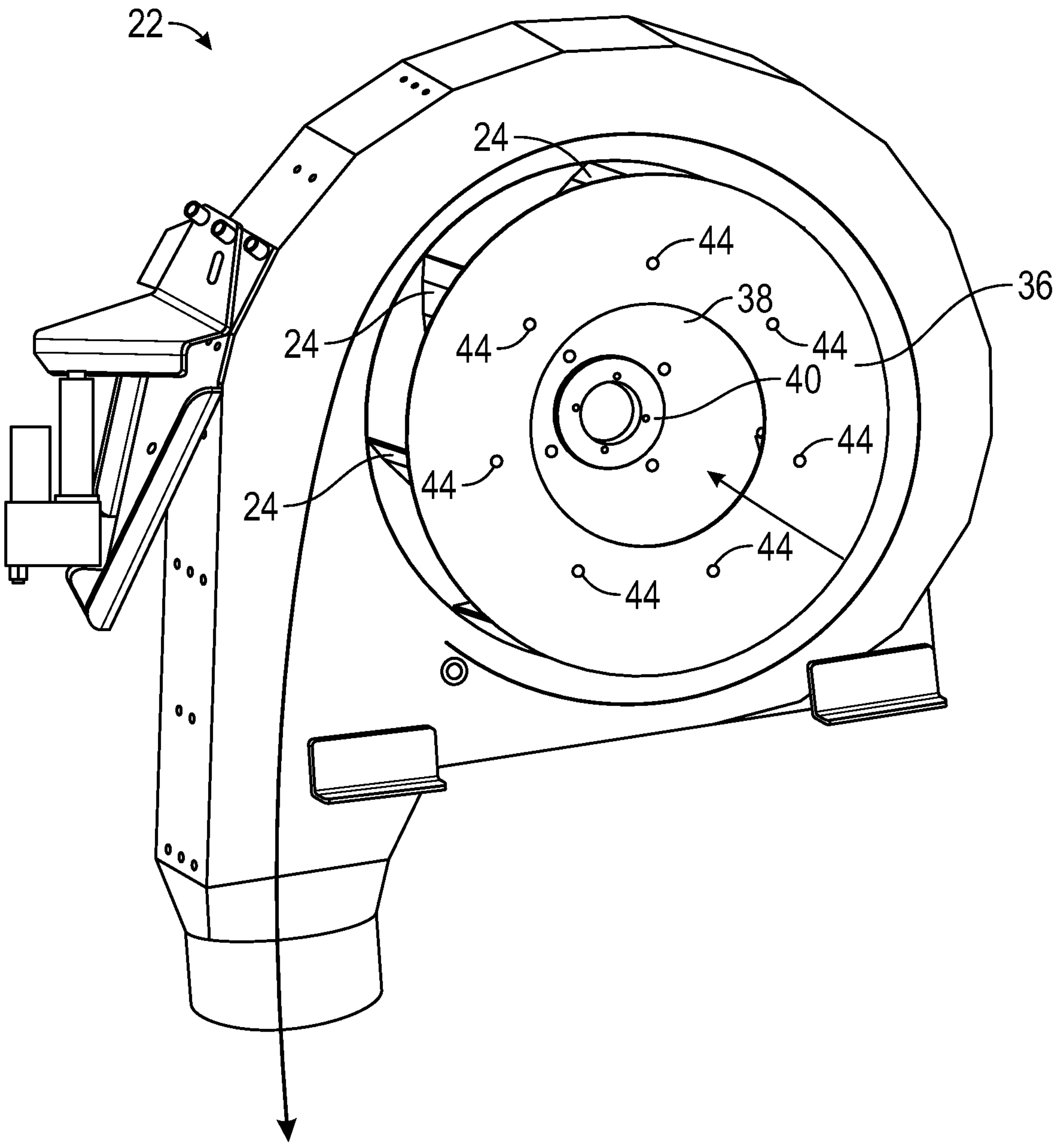
FIG. 2 is a perspective view of the fan assembly of the present invention.
Figure 3:
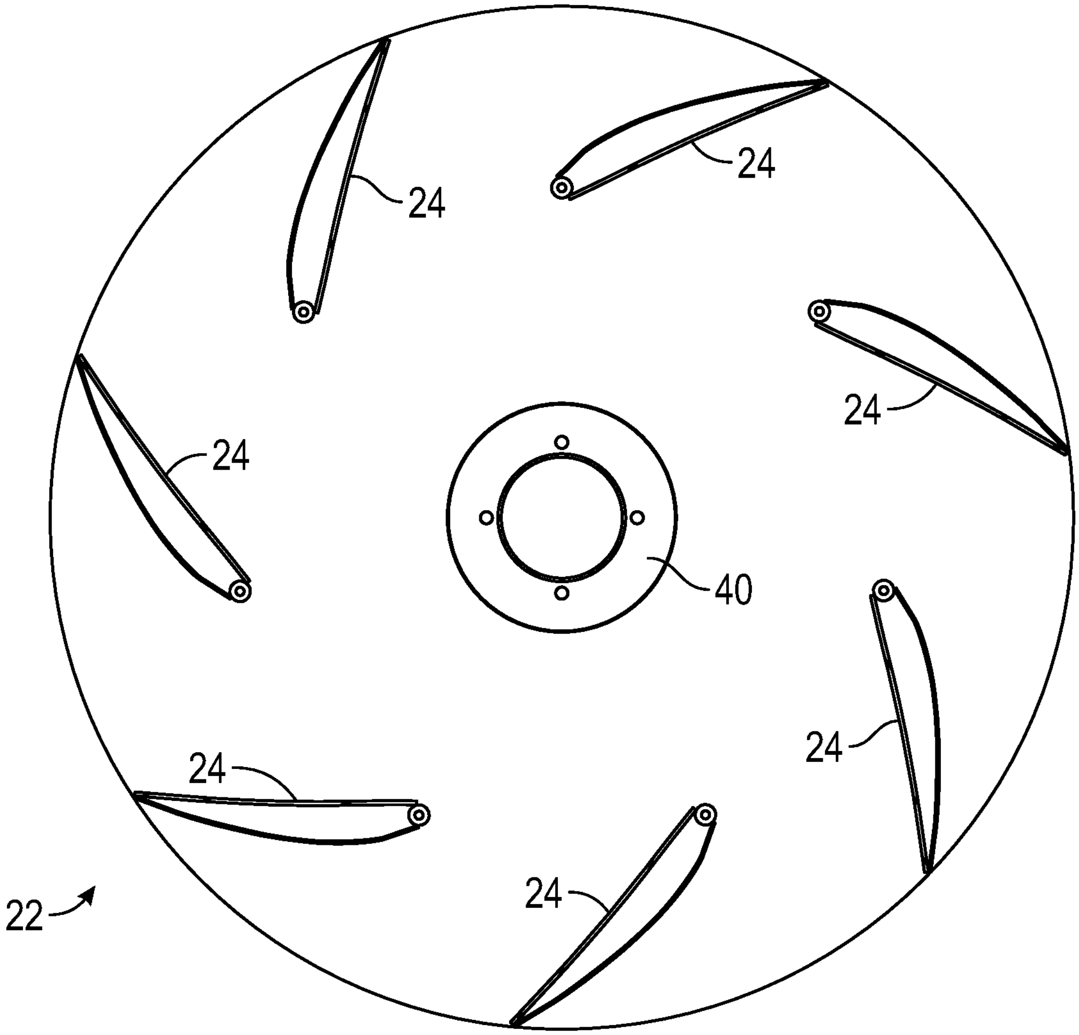
FIG. 3 is a sectional view of the fan assembly showing the arrangement of airfoil blades for the fan of the present invention.
Figure 4:
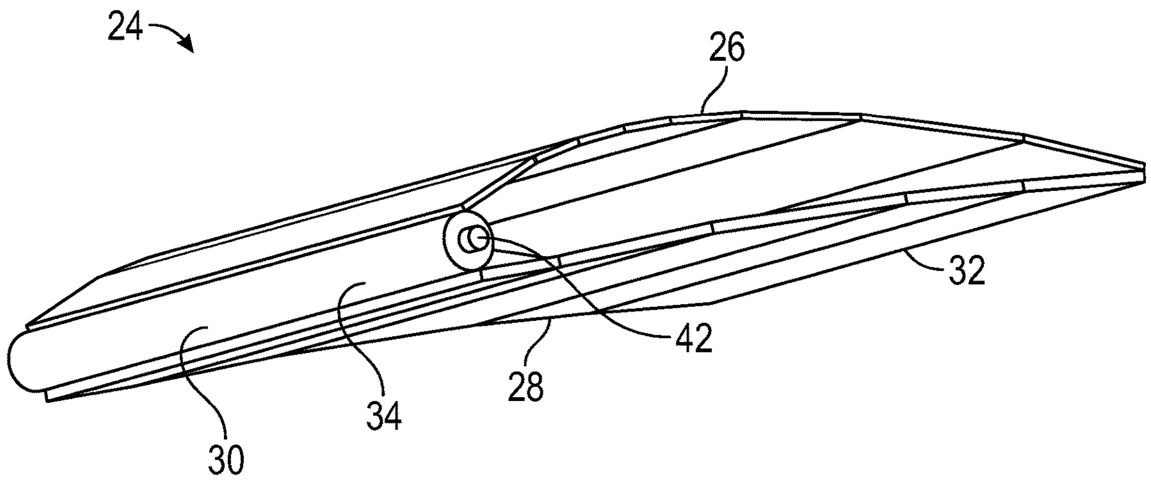
FIG. 4 is a front perspective view of one of the airfoil blades according to the present invention.
Figure 5:
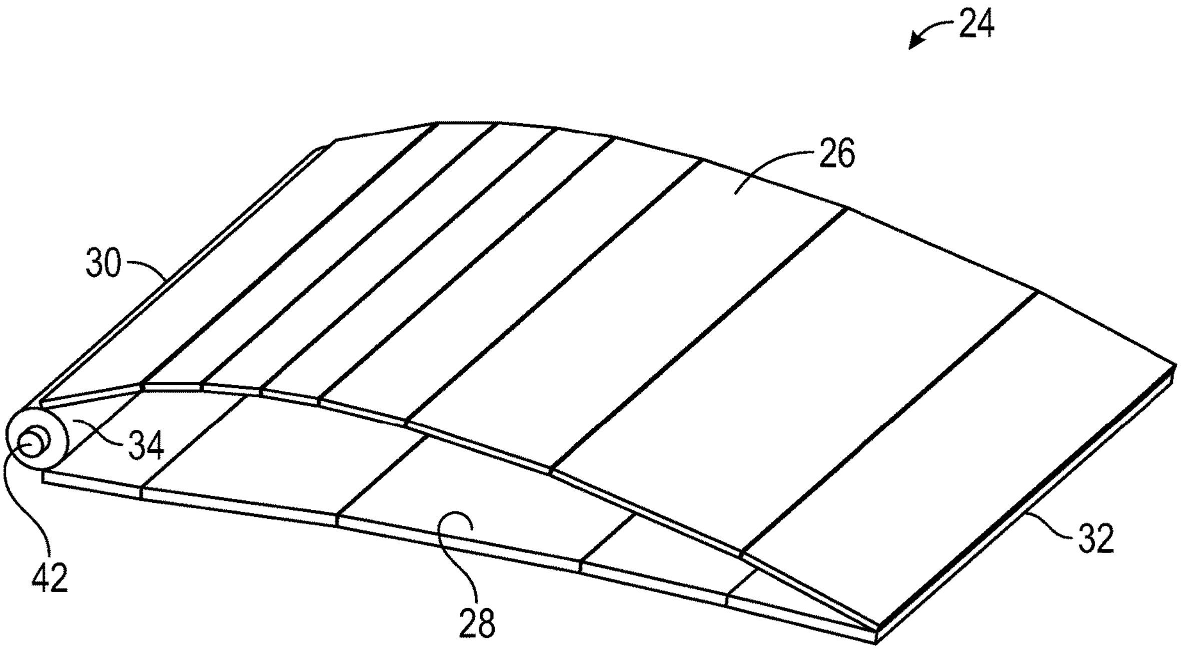
FIG. 5 is a rear perspective view of one of the airfoil blades of the invention.
Figure 6:
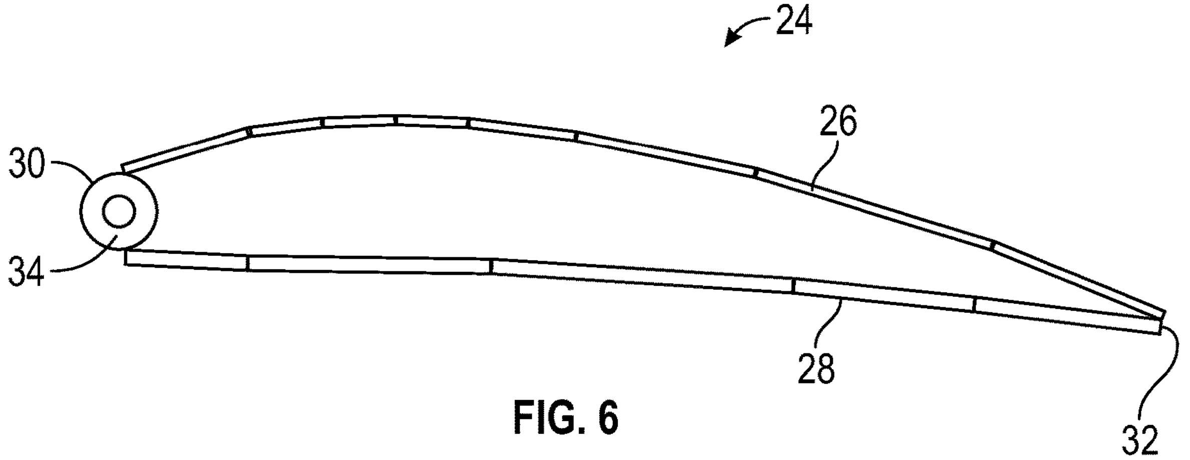
FIG. 6 is a side elevation view of one of the airfoil blades.
Figure 7:
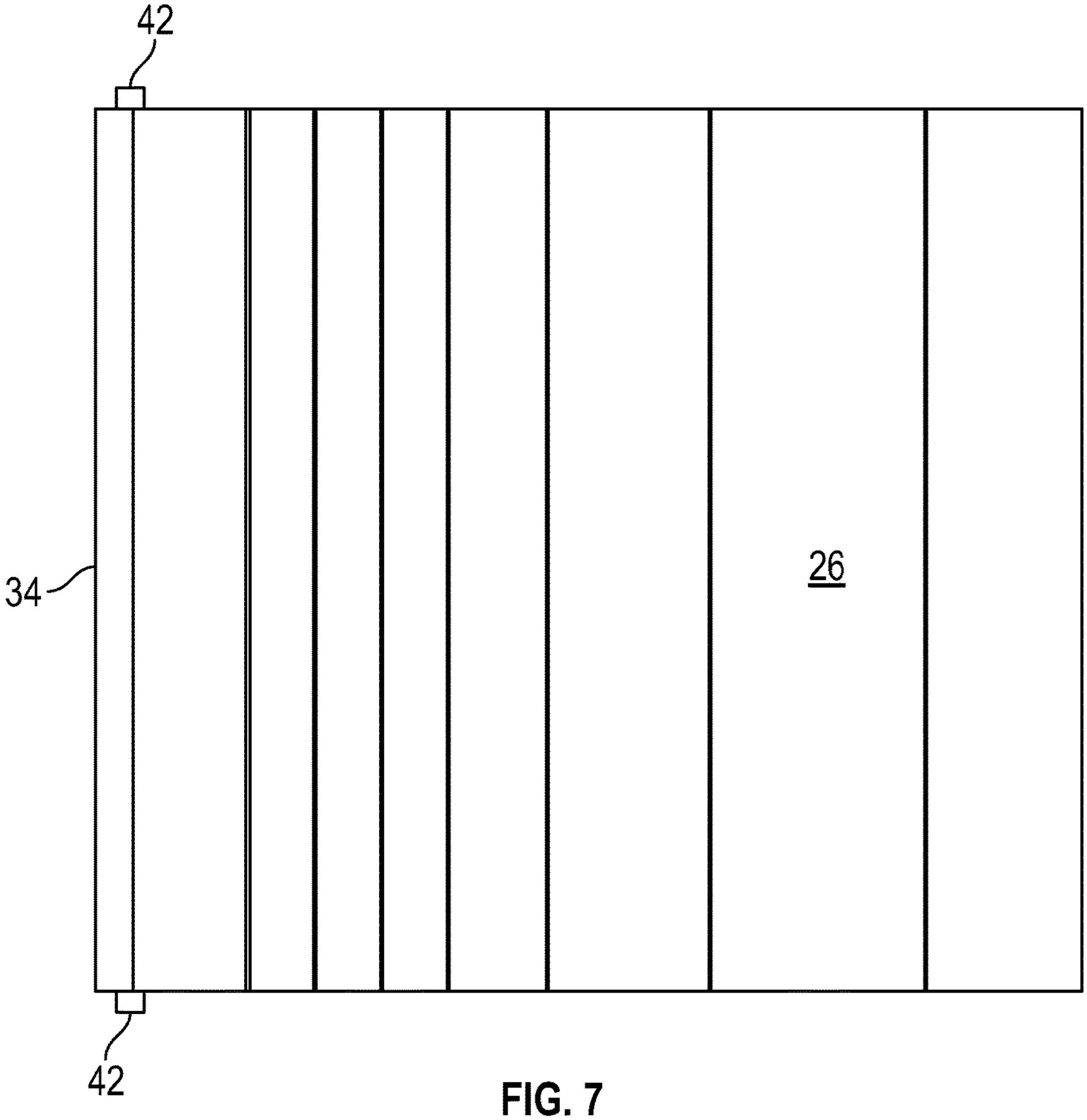
FIG. 7 is a top plane view of one of the airfoil blades.

The assembly of the fan 22 is also simplified, as compared to conventional fans. More particularly, the fan 22 includes opposite plates 36, 38. In the orientation shown in FIG. 1, the front plate 36 includes a hub 40 to which the rotational drive mechanism (not shown) is attached. The rear plate 38 has an enlarged, central opening for introduction of air into the fan 22, as indicated by the inlet arrow in FIG. 2. A curved wall extends around the perimeter edge of the plates 36, 38 such that the plates and the wall form a fan housing.

Each airfoil blade 24 has a pin 42 extending outwardly from the opposite ends of the rod 34. The pins 42 may be machined on the ends of the rod 34 or may be attached in a convenient manner to the ends of the rod 34. For example, the ends of the rod 34 may have recesses into which the pins 42 are press fit. The pins 42 of each blade 24 are adapted to be received within corresponding holes 44 in the plates 36, 38 so as to position the leading edge 30 of the blade 24 in the fan housing. Then the lateral edges of the upper and lower panels 26, 28 are welded to the inside surfaces of the plates 36, 38, such that the blade is oriented at a preferred angle of attack of approximately 9-11° relative to the rotational axis of the fan 22. Testing of the new airfoil fan blade compared to Applicant's conventional Sentry street sweeper with straight fan blades is set forth in the following table, wherein:

PH=pickup head height above the street surface;

GB=gutter broom rotational speed

| | Torque | Engine | | Horsepower Tolerance | |
|---|---|---|---|---|---|
| | (Nm) | RPM | Horsepower | Max | Min |
| 11 Degree Airfoil Fan | 39.0 | 2500 | 10.2 | 12.8 | 7.7 |
| Head down | 47.0 | 2500 | 12.3 | 15.4 | 9.2 |
| Head down + GB Down | 62.0 | 2500 | 16.2 | 20.3 | 12.2 |
| Head down + GB spinning (sweep mode) | 79.0 | 2500 | 20.7 | 25.9 | 15.5 |
| 11 Degree Road Test (PH 4, GB Sp 10) | 74.8 | 2382 | 18.7 | 23.3 | 14.0 |
| Sweep Mode (PH 3, GB Sp 8) | 68.0 | 2718 | 19.4 | 24.2 | 14.5 |
| Sweep Mode (PH 2, GB Sp 10) | 77.0 | 2717 | 21.9 | 27.4 | 16.4 |
| Sweep mode (PH 3, GB Sp 10) | 81.2 | 2715 | 23.1 | 28.9 | 17.3 |
| 11 Degree Road Test (PH 10, GB Sp 10) | 44.8 | 2700 | 12.7 | 15.8 | 9.5 |
| Head down + GB Down | 46.0 | 2700 | 13.0 | 16.3 | 9.8 |
| Sweep mode (PH 10, GB Sp 10 DP 7) | 86.0 | 2700 | 24.3 | 30.4 | 18.2 |
| Sweep mode (PH 10, GB Sp 10 DP 7) | 84.0 | 2700 | 23.7 | 29.7 | 17.8 |
| Sweep mode (PH 10, GB Sp 6 DP 7) | 62.0 | 2714 | 17.6 | 22.0 | 13.2 |
| Sweep mode (PH 10, GB Sp 6 DP 7) | 77.0 | 2701 | 21.8 | 27.2 | 16.3 |
| Sweep mode (PH 10, GB Sp 9 DP 7) | 85.8 | 2633 | 23.7 | 29.6 | 17.7 |
| Sweep mode (PH 8, GB Sp 9 DP 7) | 83.0 | 2700 | 23.5 | 29.3 | 17.6 |

-continued

| | Torque | Engine | | Horsepower Tolerance | | |
|---|---|---|---|---|---|---|
| | (Nm) | RPM | Horsepower | Max | Min | |
| Fan Starting Up | 141.9 | 1400 | 20.8 | 26.0 | 15.6 | |
| Sweep mode (PH 5, GB Sp 7 DP 7) Start up | 88.0 | 2700 | 24.9 | 31.1 | 18.7 | |
| Sweep mode (PH 5, GB Sp 7 DP 7) Constant | 81.0 | 2700 | 22.9 | 28.6 | 17.2 | |
| Current Sentry | 70.0 | 2540 | 18.6 | 23.3 | 14.0 | |
| Head down | 72.0 | 2540 | 19.1 | 23.9 | 14.4 | 56% |
| Head down + GB Down | 118.2 | 2528 | 31.3 | 39.1 | 23.5 | 93% |
| Head down + GB spinning (sweep mode) | 126.5 | 2500 | 33.1 | 41.4 | 24.8 | 60% |
| 11 Degree Road Test (PH 4, GB Sp 10) | 127.2 | 2753 | 36.7 | 45.8 | 27.5 | 97% |
| Sweep Mode (PH 3, GB Sp 8) | 117.5 | 2701 | 33.2 | 41.5 | 24.9 | 72% |
| Sweep Mode (PH 2, GB Sp 10) | 115.8 | 2680 | 32.5 | 40.6 | 24.4 | 48% |
| Sweep mode (PH 3, GB Sp 10) | 127.0 | 2703 | 35.9 | 44.9 | 27.0 | 56% |
| | | Average | | | | 70% |

From these tests, the airfoil blades reduced power consumption by 60%, compared to the straight Sentry blade. Also, the airfoil blades allow the size of the fan to be reduced, for decreased weight, easier packaging, and less expensive shipping. The airfoil blade design also reduces the noise level to a maximum of 87 dB at full speed, which is beneath the OSHA threshold for ear protection. Isolation of the fan and inclusion of dampening mechanisms can further reduce the noise level.

The fan 22 with the airfoil blades 24 can be original equipment on the street sweeper 10 or may be retrofit onto existing street sweepers.

Thus, the fan assembly, and the blade manufacturing and assembly processes described above accomplish at least all of the stated objectives.

The invention has been shown and described above with the preferred embodiments, and it is understood that many modifications, substitutions, and additions may be made which are within the intended spirit and scope of the invention. From the foregoing, it can be seen that the present invention accomplishes at least all of its stated objectives.

What is claimed is:

1. A street sweeper fan, comprising:

a housing;

a plurality of blades fixed inside the housing, each blade having a leading edge, a trailing edge, an upper surface, a lower surface, and opposite lateral sides;

each blade having pins extending laterally outwardly from the opposite lateral sides; and the blades each having a non-symmetrical airfoil profile.

2. The street sweeper fan of claim 1 wherein the pins are adjacent the leading edge of the blade.

3. The street sweeper fan of claim 1 wherein the pins extend into holes in the housing to mount the blades to the housing.

4. The street sweeper fan of claim 1 wherein the leading edge of each blade has a rod extending between the opposite lateral sides.

5. The street sweeper fan of claim 1 wherein the pins extend coaxially outwardly from the rod.

6. The street sweeper fan of claim 1 wherein the housing has opposite walls, and the pins extend into holes in the opposite walls to mount the blades to the fan housing.

7. The street sweeper fan of claim 1 wherein the fan has a rotational axis and each blade has an angle of attack of 9-11° relative to the rotational axis.

8. The street sweeper fan of claim 1 wherein the leading and trailing edges are fixed to the housing.

9. The street sweeper fan of claim 1 wherein each blade has upper and lower panels, the upper and lower panels having forward edges secured to one another, and the upper and lower panels having rearward edges secured to one another.

10. The street sweeper of claim 9 further comprising a rod attached to the forward edges of the upper and lower panels.

11. The street sweeper of claim 10 wherein the housing has opposite side walls, and the rod is mounted to the opposite side walls of the housing.

12. The street sweeper fan of claim 1 wherein the upper surface is curved and the lower surface is curved, with the curvature of the upper surface being greater than the curvature of the lower surface.

13. The street sweeper fan of claim 1 wherein the upper surface is convex and the lower surface is concave.

14. The street sweeper fan of claim 1 wherein the upper surface has a length extending perpendicularly between the leading and trailing edges which is greater than a length extending perpendicularly between the leading and trailing edges of the lower surface.

15. The street sweeper fan of claim 1 wherein the upper and lower surfaces have different shapes.

16. A street sweeper fan, comprising:

a housing;

a plurality of blades fixed inside the housing, each blade having a leading edge, a trailing edge, an upper surface, a lower surface, and opposite lateral sides;

the leading edge of each blade having a rod extending between the opposite lateral sides; and the blades each having a non-symmetrical airfoil profile.

17. The street sweeper fan of claim 16 wherein each blade has pins extending laterally outwardly from the opposite lateral sides.

18. The street sweeper of claim 16 wherein the housing has opposite side walls, and the rod is mounted to the opposite side walls of the housing.

19. A street sweeper fan, comprising:

a housing;

a plurality of blades fixed inside the housing, each blade having a leading edge, a trailing edge, an upper surface, a lower surface, and opposite lateral sides;

each blade having upper and lower panels, the upper and lower panels having forward edges secured to one another, and the upper and lower panels having rearward edges secured to one another;

a rod attached to the forward edges of the upper and lower panels; and the blades each having a non-symmetrical airfoil profile.

20. The street sweeper fan of claim 19 wherein each blade has pins extending laterally outwardly from the opposite lateral sides.

* * * * *